United States Patent
Ehrlich

(10) Patent No.: US 12,456,486 B1
(45) Date of Patent: Oct. 28, 2025

(54) DIGITAL-FILTER ENGINE WITH PRE-COMPUTE OF OUTPUT

(71) Applicants: Kabushiki Kaisha Toshiba, Tokyo (JP); Toshiba Electronic Devices & Storage Corporation, Tokyo (JP)

(72) Inventor: Richard M. Ehrlich, Edina, MN (US)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/893,326

(22) Filed: Sep. 23, 2024

(51) Int. Cl.
  G11B 5/596 (2006.01)
  G11B 5/55 (2006.01)

(52) U.S. Cl.
  CPC ........ G11B 5/59622 (2013.01); G11B 5/5573 (2013.01)

(58) Field of Classification Search
  None
  See application file for complete search history.

(56) References Cited

U.S. PATENT DOCUMENTS

| | | | |
|---|---|---|---|
| 6,614,615 B1 * | 9/2003 | Ju | G11B 5/59622 360/78.04 |
| 6,614,618 B1 * | 9/2003 | Sheh | G11B 5/5521 360/78.09 |
| 7,656,607 B1 * | 2/2010 | Bennett | G11B 5/59688 360/77.02 |
| 7,982,990 B1 * | 7/2011 | Yu | G11B 20/10314 360/39 |
| 8,508,878 B1 * | 8/2013 | Zou | G11B 5/59616 360/48 |
| 11,862,196 B1 * | 1/2024 | Ehrlich | G11B 21/106 |
| 2003/0058558 A1 | 3/2003 | Ottesen | |
| 2003/0133212 A1 | 7/2003 | Fulkerson | |
| 2008/0266694 A1 * | 10/2008 | Bliss | G11B 20/10046 360/32 |
| 2011/0299190 A1 * | 12/2011 | Lee | G11B 5/6029 360/75 |

* cited by examiner

*Primary Examiner* — Peter Vincent Agustin
(74) *Attorney, Agent, or Firm* — Kim & Stewart LLP

(57) ABSTRACT

A digital filter completes a portion of digital filter operations performed on a control signal before the control signal has been determined. Calculation delay associated with performing digital filter operations on the control signal can be reduced and stability of the servo control system improved. For a particular servo wedge of a storage disk, an estimated control signal is used to determine a pre-computed first output of a digital filter before an actual control signal for that particular servo wedge has been determined. Then, once the actual control signal for the servo wedge has been determined, an implemented second output of the digital filter is determined based on the pre-computed first output and a difference between the estimated control signal and the actual control signal. The implemented second output of the digital filter is used to control magnetic head position in response to crossing the servo wedge.

20 Claims, 8 Drawing Sheets

DIGITAL-FILTER ENGINE WITH PRE-COMPUTE OF OUTPUT

BACKGROUND

Magnetic hard disk drives (HDDs) have been employed in information technology as a low-cost means for providing random access to large quantities of data. As the need for data storage has expanded, the areal density of information stored in HDDs has continuously increased. In addition to high storage capacity, the ability of an HDD to access stored data quickly is also important.

To meet the ever-increasing requirements for high access performance and faster throughput, HDDs have been designed to rotate storage disks at ever-greater speeds. Given the high rotational speeds of storage disks and areal density of stored data in modern HDDs, the servo system for positioning a magnetic head in an HDD generally requires a very short response time in which a suitable control signal must be determined and implemented after a position-error signal for the magnetic head is received. For example, a typical interval between received position-error signals can be on the order of 10 or 20 microseconds. Consequently, even a delay of a few microseconds in generating a control signal can degrade the stability of the closed-loop servo system. However, once a position-error signal is received for a magnetic head, significant computations must be performed to determine a suitable control signal, and such computations require a finite amount of time for completion. Furthermore, before being employed to control the position of the magnetic head, the control signal typically undergoes multiple filtering operations that require additional time for completion. As a result, with higher rotational speed of the storage disks of an HDD and high performance requirements, the stability margin for the servo system controlling a magnetic head of the HDD is reduced.

In light of the above, there is a need in the art for approaches that enable reduced calculation delay and increased servo-stability margins in the control of magnetic head position in an HDD.

SUMMARY

One or more embodiments provide systems and methods for a digital filter engine that completes a portion of the digital filter operations that are performed on a servo control signal before the servo control signal has actually been determined. Consequently, calculation delay associated with performing digital filter operations on the servo control signal can be greatly reduced and stability of the servo control system improved. In the embodiments, for a particular servo wedge of a storage disk, an estimated control signal is used to determine a pre-computed first output of a digital filter before an actual control signal for that particular servo wedge has been determined. Then, once the actual control signal for the servo wedge has been determined, an implemented second output of the digital filter is determined based on the pre-computed first output and a difference between the estimated control signal and the actual control signal, where the implemented second output of the digital filter is used to control magnetic head position in response to crossing the servo wedge. After the implemented second output of the digital filter is used to control magnetic head position, the actual control signal is then input into the digital filter to update the set of state variable values of the digital filter for the next servo wedge. In the embodiments, the same set of state variable values of the digital filter are employed to determine the pre-computed first output and to update the set of state variable values of the digital filter for the next servo wedge.

A method of controlling an actuator for a magnetic head of a disk drive via a digital filter, according to an embodiment, includes determining a first output of the digital filter for a first servo wedge, based on a set of state variable values associated with the digital filter and an estimated control input to the digital filter; after determining the first output, receiving an actual control input for the digital filter that is based on position information associated with the magnetic head crossing the first servo wedge; determining a second output of the digital filter for the first servo wedge based on the first output, the estimated control input, and the actual control input; and applying the second output of the digital filter to the actuator.

A magnetic disk drive, according to another embodiment, includes: a magnetic head; an actuator for positioning the magnetic head; a digital filter; a recording surface with a plurality of servo wedges formed thereon; and a controller. The controller is configured to perform the steps of: determining a first output of the digital filter for a first servo wedge included in the plurality of servo wedges, based on a set of state variable values associated with the digital filter and an estimated control input to the digital filter; after determining the first output, receiving an actual control input for the digital filter that is based on position information associated with the magnetic head crossing the first servo wedge; determining a second output of the digital filter for the first servo wedge based on the first output, the estimated control input and the actual control input; and applying the second output of the digital filter to the actuator.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

System Overview

Figure 1:
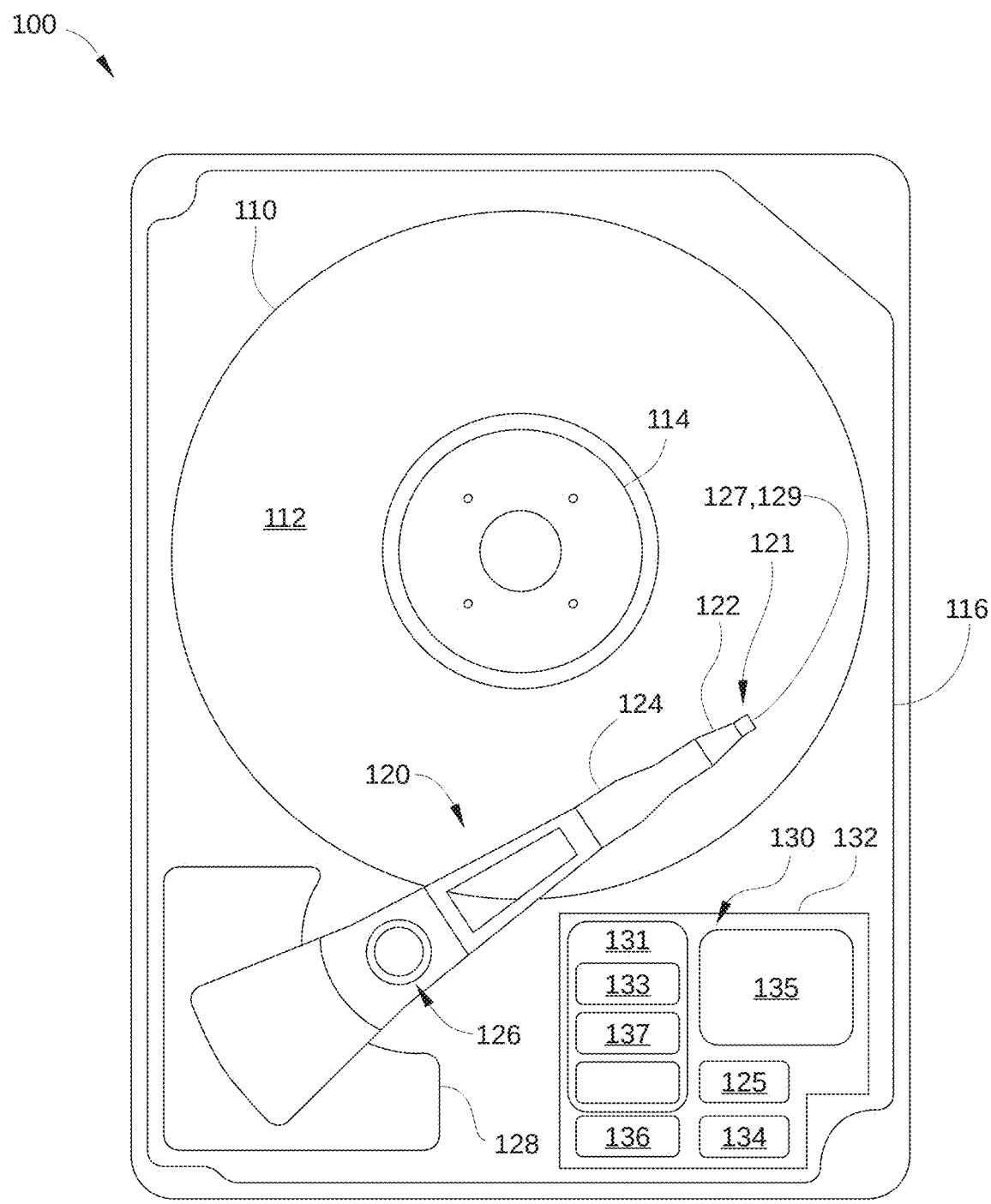
FIG. 1 is a schematic view of an exemplary hard disk drive, according to one embodiment.

FIG. 1 is a schematic view of an exemplary hard disk drive (HDD) 100, according to one embodiment. For clarity, HDD 100 is illustrated without a top cover. HDD 100 includes multiple storage disks 110 (only one of which is visible in FIG. 1) that each include one or two recording surfaces 112 on which a plurality of concentric data storage tracks are disposed. In FIG. 1, only the top recording surface 112 of storage disk 110 is visible. The one or more storage disks 110 are coupled to and rotated by a spindle motor 114 that is mounted on a base plate 116. An actuator arm assembly 120 is also mounted on a base plate 116, and includes multiple sliders 121 (only one of which is visible in FIG. 1), each mounted on a flexure arm 122 with a magnetic read/write head 127 that reads data from and writes data to the data storage tracks of an associated recording surface 112. Each flexure arm 122 is attached to an actuator arm 124 that is rotated about a bearing assembly 126 by a voice coil motor (VCM) 128. Thus, VCM 128 moves all of the multiple sliders 121 radially relative to a respective recording surface 112 of a storage disk 110, thereby positioning read/write head 127 over a desired concentric data storage track. Spindle motor 114, read/write head 127, and VCM 128 are coupled to electronic circuits 130, which are mounted on a printed circuit board 132. In some embodiments, each read/write head 127 has an associated additional actuator 129, such as a microactuator. The additional actuator 129 can be on the suspension (e.g., flexure arm 122), at a gimbal between the suspension and slider 121, or on slider 121, and can move the associated read/write head 127 radially a small distance. Such actuators are generally referred to as dual-stage actuators, and enable the servo system of HDD 100 to attain more accurate tracking control.

In the embodiment illustrated in FIG. 1, a single actuator arm assembly 120 is shown that includes only one slider 121, one flexure arm 122, one actuator arm 124, one read/write head 127, and one additional actuator 129. In other embodiments, actuator arm assembly 120 includes a plurality of actuator arms 124, sliders 121, flexure arms 122, read/write heads 127, and additional actuators 129, where each read/write head 127 is associated with a different recording surface 112 of HDD 100. Further, in some embodiments, HDD 100 can include multiple actuator arm assemblies 120 that are each rotated about bearing assembly 126 by a respective VCM 128 independently from each other. In such embodiments, each actuator arm assembly 120 may each include a plurality of actuator arms 123, sliders 121, flexure arms 122, read/write heads 127, and additional actuators 129.

Electronic circuits 130 include a read/write channel 137, a microprocessor-based controller 133, random-access memory (RAM) 134 (which may be a dynamic RAM and used as one or more data buffers) and/or a flash memory device 135, and, in some embodiments, a flash manager device 136. In some embodiments, read/write channel 137 and microprocessor-based controller 133 are included in a single chip, such as a system-on-chip 131. In some embodiments, HDD 100 further includes a motor-driver chip 125 that accepts commands from microprocessor-based controller 133 and drives spindle motor 114, VCM 128, and additional actuator 129. Read/write channel 137 communicates with the read/write head 127 via a preamplifier (not shown) that may be mounted on a flex-cable that is itself mounted on either base plate 116, actuator arm 120, or both. The preamplifier supplies a write signal (e.g., current) to read/write head 127 in response to write data input from read/write channel 137. In addition, the preamplifier amplifies a read signal output from read/write head 127 and transmits the amplified read signal to read/write channel 137.

When data are transferred to or from a particular storage disk 110 of HDD 100, actuator arm assembly 120 moves in an arc between the inner diameter (ID) and the outer diameter (OD) of a particular storage disk 110. Actuator arm assembly 120 accelerates in one angular direction when current is passed in one direction through the voice coil of VCM 128 and accelerates in an opposite direction when such current is reversed, thereby allowing control of the position of actuator arm assembly 120 and the attached read/write head 127 with respect to the particular storage disk 110. VCM 128 is coupled with a servo system that uses the positioning data read from servo wedges on storage disk 110 by read/write head 127 to determine the position of read/write head 127 over a specific data storage track. For example, the servo system may position read/write head 127 over recording surface 112 based on positioning data read from recording surface 112.

In positioning a read/write head 127 over a recording surface 112, the servo system determines an appropriate current to drive through the voice coil of VCM 128, and drives said current using a current driver and associated circuitry. Typically, the appropriate current is determined based in part on a position feedback signal of the read/write head 127, such as a position error signal (PES). The PES is typically generated by using servo patterns included in the servo wedges (not shown) on the recording surface 112 as a reference. One embodiment of a recording surface 112 is illustrated in FIG. 2.

Figure 2:
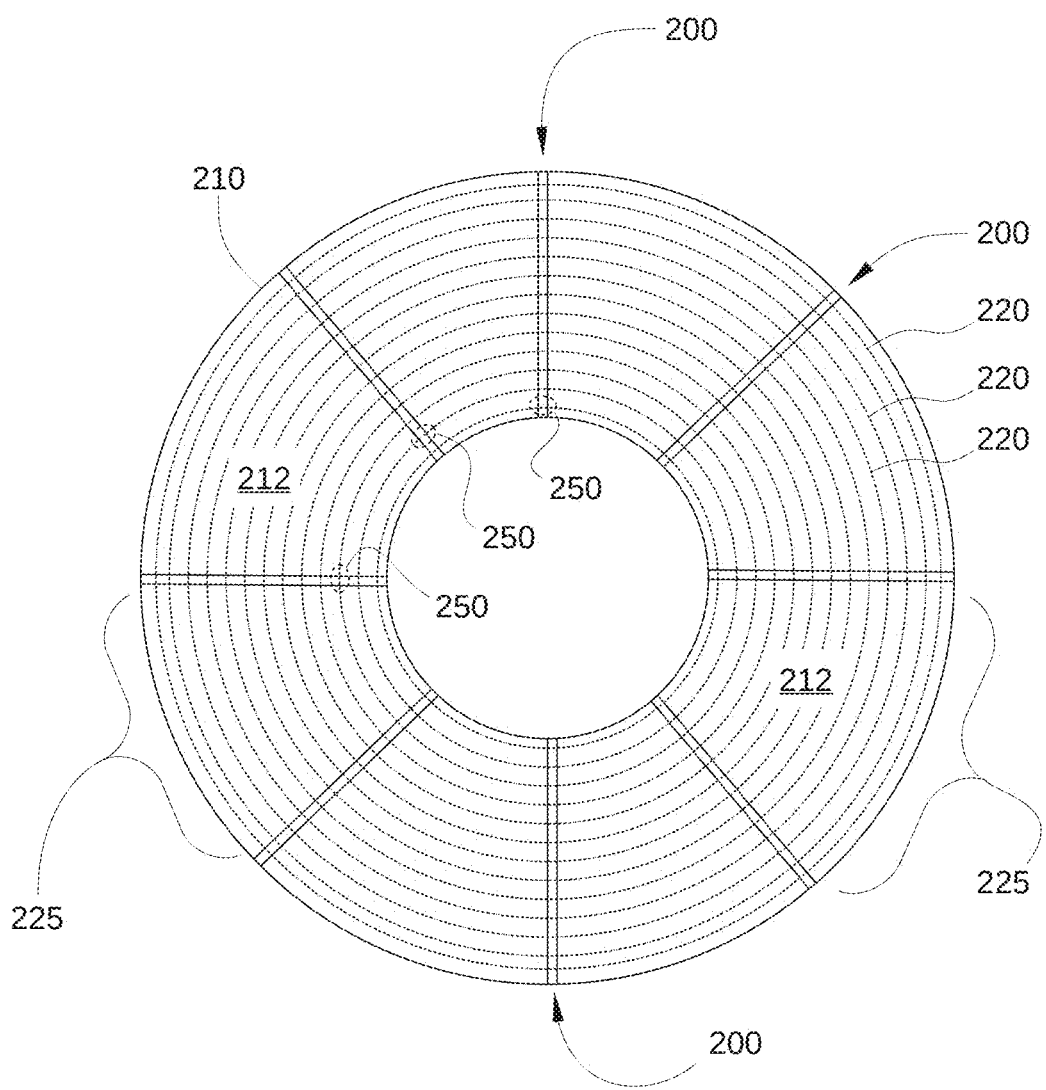
FIG. 2 schematically illustrates a recording surface of a storage disk with concentric data storage tracks formed thereon, according to an embodiment.

FIG. 2 illustrates a recording surface 212 of a storage disk 210 with servo wedges 200 and concentric data storage tracks 220 formed thereon, according to an embodiment. Recording surface 212 can be consistent with recording surface 112 in FIG. 1. Servo wedges 200 may be written on recording surface 212 by either a media writer, or by HDD 100 itself via a self-servo-write (SSW) process. Servo wedges 200 are typically radially aligned. In practice, servo wedges 200 may be somewhat curved. For example, servo wedges 200 may be configured in a spiral pattern that mirrors the path that would be followed by a corresponding read/write head 127 (shown in FIG. 1) if the read/write head 127 were to be moved across the stroke of one actuator arm assembly 120 while storage disk 210 is not spinning. Such a curved pattern advantageously results in the wedge-to-wedge timing being independent of the radial position of the read/write head 127. For simplicity, servo wedges 200 are depicted as substantially straight lines in FIG. 2. Each servo wedge 200 includes a plurality of servo sectors 250 containing servo information that defines the radial position and track pitch, i.e., spacing, of data storage tracks 220.

Data storage tracks 220 for storing data are located in data regions 225, and are positionally defined by the servo information written in servo sectors 250. The region between two servo sectors may contain more than, equal to, or less than one data sector, including the possibility of fractional data-sectors. Each servo sector 250 encodes a reference signal that is read by the read/write head 127 as the read/write head 127 passes over the servo sector. Thus, during read and write operations, the read/write head 127 can be positioned above a desired data storage track 220. Typically, the actual number of data storage tracks 220 and servo wedges 200 included on recording surface 212 is considerably larger than that illustrated in FIG. 2. For example, recording surface 212 may include hundreds of thousands of concentric data storage tracks 220 and hundreds of servo wedges 200.

Figure 3:
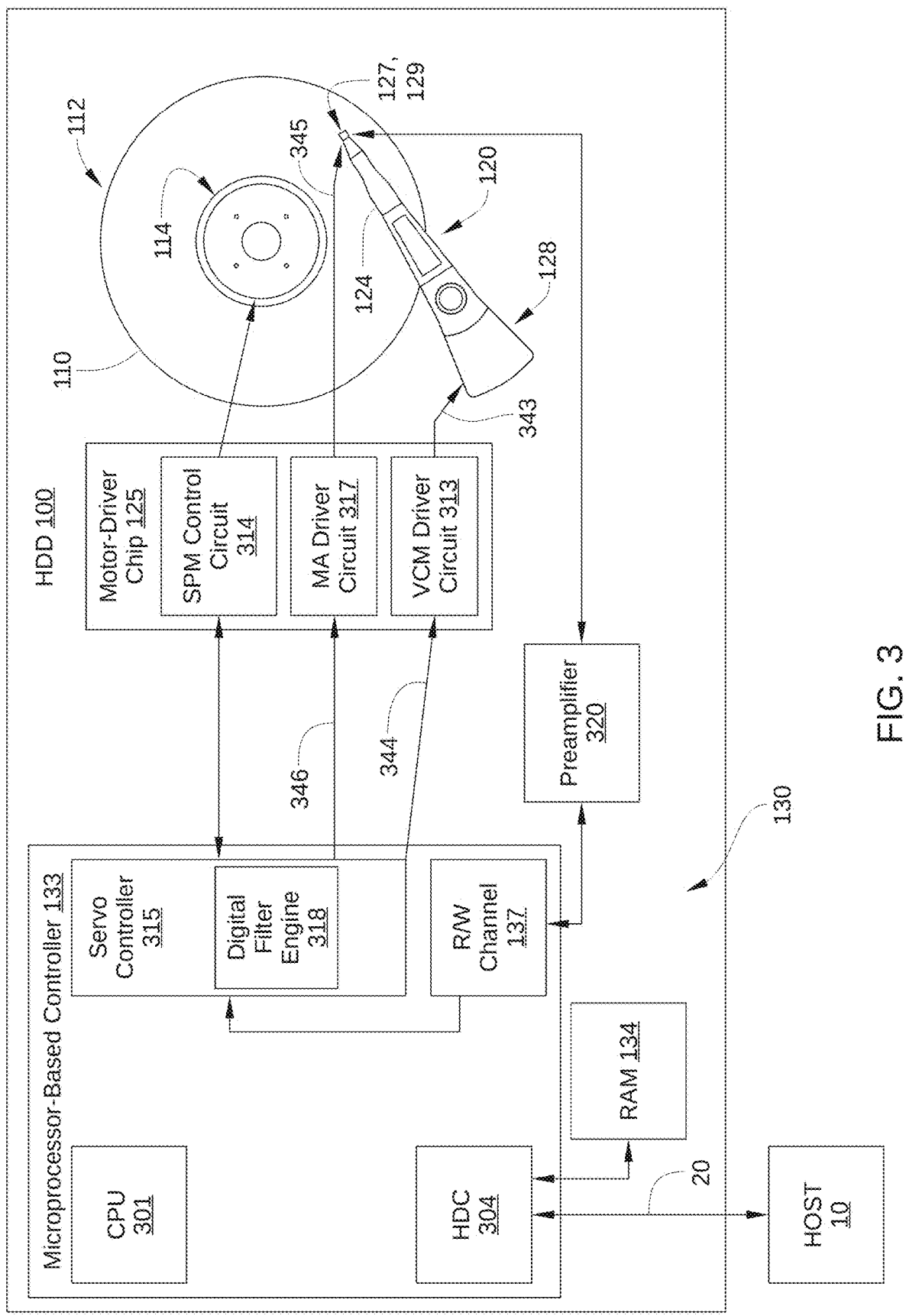
FIG. 3 illustrates an operational diagram of the HDD of FIG. 1 configured to implement various embodiments.

FIG. 3 illustrates an operational diagram of HDD 100 configured to implement various embodiments. In the embodiment illustrated in FIG. 3, a specific configuration of certain elements of electronic circuits 130 is described. In other embodiments, any other suitable arrangement or configuration of electronic circuits 130 may be employed that is operable to implement one or more embodiments described herein. For example, in some embodiments, various elements of microprocessor-based controller 133 may be configured in a single SoC and/or implemented as stand-alone chips included in electronic circuits 130.

HDD 100 is connected to a host 10, such as a host computer, via a host interface 20, such as a serial advanced technology attachment (SATA) bus or a Serial Attached Small Computer System Interface (SAS) bus. As shown, electronic circuits 130 of HDD 100 include microprocessor-based controller 133 and motor driver chip 125 communicatively coupled to microprocessor-based controller 133.

In the embodiment illustrated in FIG. 3, microprocessor-based controller 133 includes one or more central processing units (CPUs) 301 or other processors, a servo controller 315, a hard disk controller (HDC) 304, and read/write channel 137. Motor-driver chip 125 includes a spindle motor (SPM) control circuit 314, a VCM driver circuit 313, and a microactuator (MA) driver circuit 317. VCM driver circuit 313 includes VCM driver circuitry (not shown) that generates an amplified control signal 343 in response to filtered control signals 344 (such as VCM commands) output from servo controller 315, and MA driver circuit 317 includes microactuator driver circuitry (not shown) that generates an amplified control signal 345 in response to filtered control signals 346 (such as MA commands) output from servo controller 315. Filtered control signals 344 and 346 and amplified control signals 343 and 345 enable execution of disk access commands received from host 10 that are to be executed by a servo system of HDD 100 that includes VCM 128 and additional actuator 129.

In the embodiment illustrated in FIG. 3, HDD 100 includes a single RAM 134 that is external to microprocessor-based controller 133. In other embodiments, HDD 100 may include any other suitable configuration of RAM 134, such as a DRAM device integrated in microprocessor-based controller 133.

HDD 100 further includes a preamplifier 320 associated with read/write head 127. Preamplifier 320 can be mounted on actuator arm assembly 120 or elsewhere within the head and disk assembly (HDA) of HDD 100. Preamplifier 320 amplifies a read signal output from a read sensor of read/write head 127 and transmits the amplified read signal to read/write channel 137. In addition, preamplifier 320 supplies a write signal (e.g., current) to a write head of read/write head 127 in response to write data input from read/write channel 137.

CPU 301 controls HDD 100, for example according to firmware stored in flash memory device 135 (shown in FIG. 1) or another nonvolatile memory, such as portions of recording surfaces 112. For example, CPU 301 manages various processes performed by HDC 304, read/write channel 137, recording surfaces 112, and/or motor-driver chip 125. Such processes include a writing process for writing data onto recording surfaces 112, a reading process for reading data from recording surfaces 112, various calibration processes, a self-servo-writing process, and the like.

Read/write channel 137 is a signal processing circuit that decodes read signals transmitted from preamplifier 320 into read data that are outputted to HDC 304. In addition, read/write channel 137 encodes write data input from HDC 304 and outputs the encoded write data to preamplifier 320. In some embodiments, HDC 304 controls access to RAM 134 by CPU 301 and read/write channel 137, and receives/transmits data from/to host 10. In some embodiments, HDC 304 receives/transmits data from/to host 10 via interface 20.

In some embodiments, a servo system of HDD 100 (e.g., CPU 301, read/write channel 137, preamplifier 320, servo controller 315, voice-coil motor 128, and a suitable microactuator 129) performs positioning of read/write head 127 included in actuator arm assembly 120 over a corresponding recording surface 112. Generally, servo controller 315 receives a position feedback signal or other positioning information from read/write channel 137 and determines a PES for read/write head 127 based on the received positioning information and a target position of read/write head 127. Servo controller 315 then determines an appropriate servo control signal (such as a current or voltage) to drive through the voice coil of VCM 128 based in part on the PES. In the embodiment illustrated in FIG. 3, the servo control signals determined by servo controller 315 correspond to filtered control signals 344 and 346.

To avoid excitation of specific mechanical resonances of HDD 100 and/or to stabilize the servo system of HDD 100, a digital filter engine 318 of HDD 100 performs one or more filtering operations on servo control signal determined by servo controller 315 to generate filtered control signals 344 and 346. In the embodiment illustrated in FIG. 3, digital filter engine 318 is included in servo controller 315. In other embodiments, digital filter engine 318 can reside elsewhere within electronic circuits 130. Embodiments of digital filter engine 318 are described below in conjunction with FIGS. 4 and 5.

Digital Filter Engine

Figure 4:
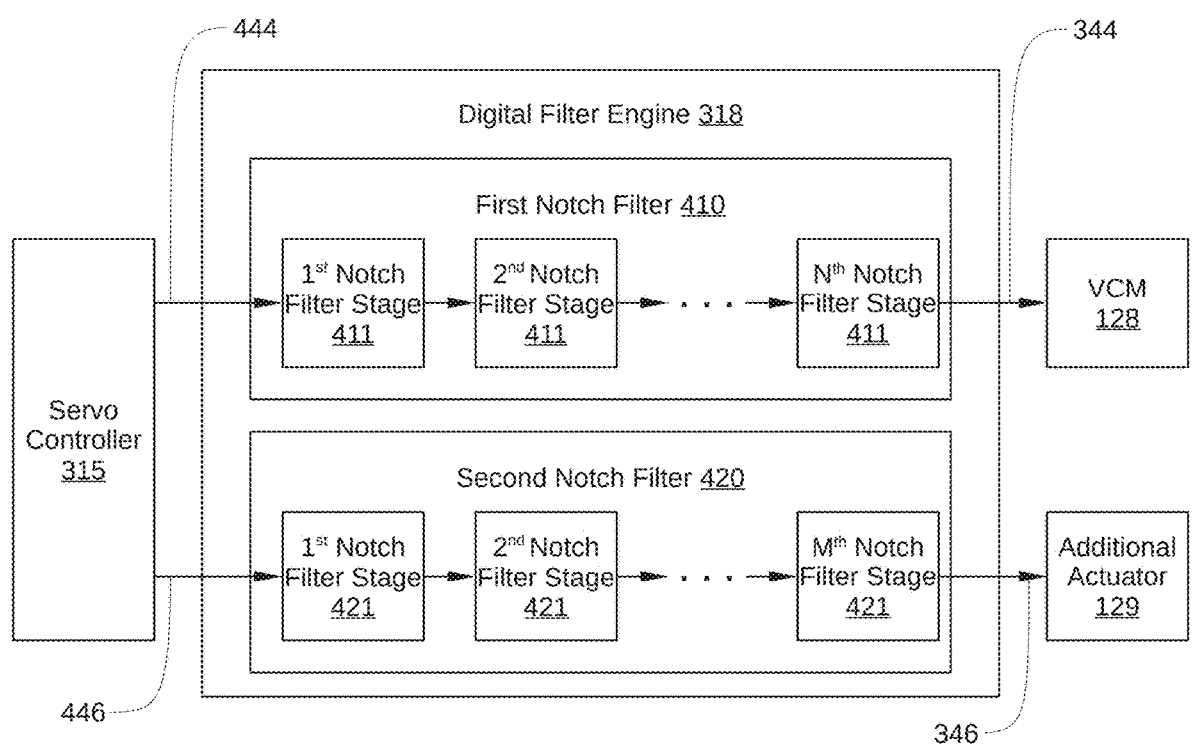
FIG. 4 is a conceptual block diagram of a digital filter engine, according to various embodiments.

FIG. 4 is a conceptual block diagram of digital filter engine 318, according to various embodiments. As noted previously, digital filter engine 318 is employed as part of a servo system of HDD 100 to filter (or "phase-tune") servo control signals (e.g., 444 and 446) determined by servo controller 315 to generate filtered control signals (e.g., filtered control signals 344 and 346). Generally, digital filter engine 318 performs one or more filtering operations on servo control signals 444 and 446 determined by servo controller 315 before such servo control signals are implemented by VCM 128 and additional actuator 129. For example, in some embodiments, each of the one or more filtering operations corresponds to a stage of a notch filter, where each stage corresponds to a specific frequency at which a mechanical resonance of HDD 100 or an external disturbance to HDD 100 is known to exist. Thus, in such embodiments, each stage of the notch filter enables suppression of a resonance or disturbance associated with a specific frequency.

In the embodiment illustrated in FIG. 4, digital filter engine 318 includes a first notch filter 410 with a plurality of N notch filter stages 411 and a second notch filter 420 with a plurality of M notch filter stages 421. First notch filter 410 can be employed for filtering control signals 444 prior to being transmitted to and implemented by VCM 128, where an output of one notch filter stage 411 is the input of the following notch filter stage 411. Second notch filter 420 can be employed for filtering control signals 446 prior to being transmitted to and implemented by additional actuator 129, where an output of one notch filter stage 421 is the input of the following notch filter stage 421. One embodiment of a notch filter stage (such as a notch filter stage 411 or a notch filter stage 421) is described below in conjunction with FIG. 5.

Figure 5:
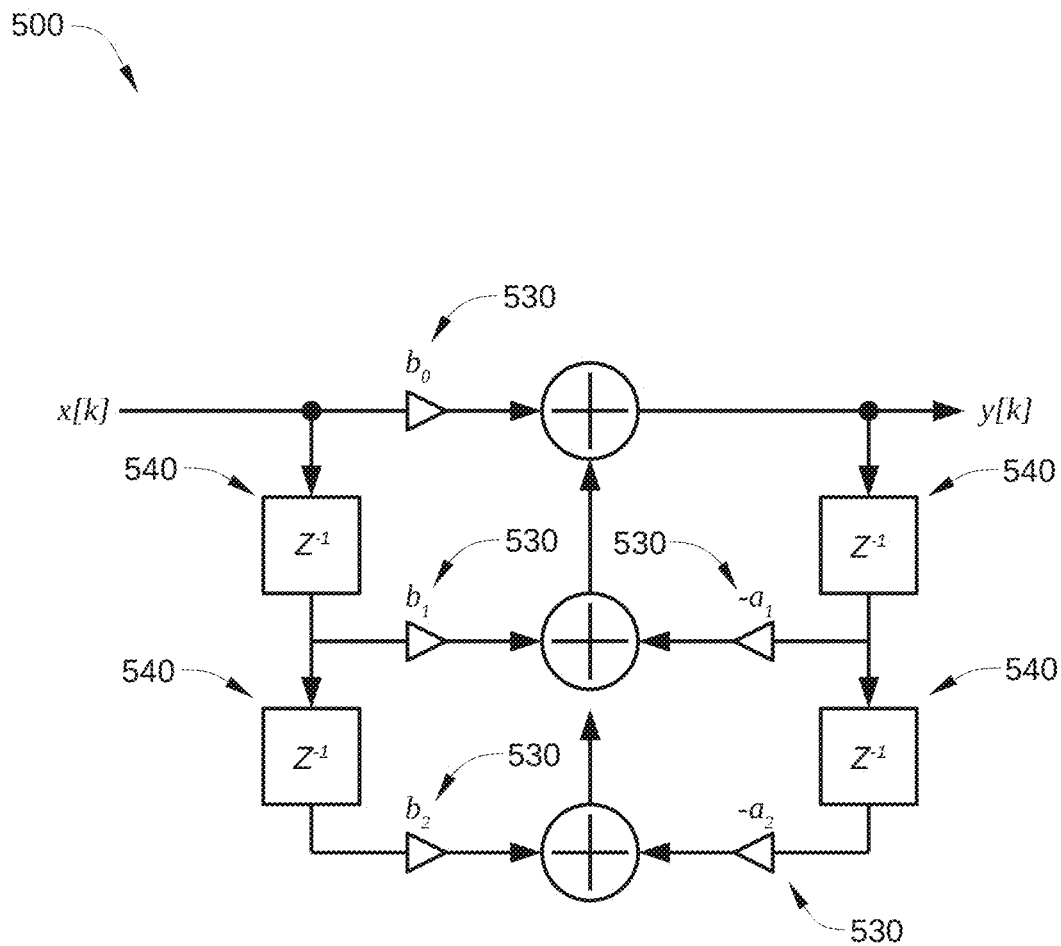
FIG. 5 is a conceptual diagram of a notch filter stage, according to various embodiments.

FIG. 5 is a conceptual diagram of a notch filter stage 500, according to various embodiments. Notch filter stage 500 can be employed as one of the N notch filter stages 411 of first notch filter 410 and/or as one of the M notch filter stages 421 of second notch filter 420. As such, an output y[k] of notch filter stage 500 can serve as an input x[k] of a following notch filter stage (not shown).

In the embodiment illustrated in FIG. 5, notch filter stage 500 is implemented as a second-order notch filter stage that uses five parameter values 530 (indicated as $b_0$, $b_1$, $b_2$, $a_1$, and $a_2$ in FIG. 5) and four state variable values 540. In notch filter stage 500, the four state variable values 540 include x[k−1], x[k−2], y[k−1], y[k−2]. In some embodiments, notch filter stage 500 generates output y[k] based on Equation 1:

$$y[k]=b_0x[k]+b_1x[k-1]+b_2x[k-2]-a_1y[k-1]-a_2y[k-2] \quad (1)$$

Parameter values 530 are used as multipliers to configure notch filter stage 500 to have a targeted response, such as to suppress a specific frequency in the servo control system of HDD 100. Therefore, each of the N notch filter stages 411 of first notch filter 410 and each of the M notch filter stages 421 of second notch filter 420 generally have different parameter values 530. Parameter values 530 can be stored in a medium that enables fast access, for example in RAM 134 (shown in FIG. 1).

The four state variable values 540 of notch filter stage 500 are specific sample values, which are represented in FIG. 5 using different delay operators ($Z^{-1}$). In contrast to parameter values 530, state variable values 540 generally change continuously during operation of HDD 100. In some embodiments, state variable values 540 are stored in registers associated with or included in digital filter engine 318. In FIG. 5, a sample x[k] is the input to notch filter stage 500 that is associated with a particular servo wedge k that is crossed by a magnetic head of HDD 100 (e.g., read/write head 127). Then, as indicated by the different delay operators $Z^{-1}$, the four state variable values 540 are x[k−1], x[k−2], y[k−1], y[k−2], which are values that have been output by or previously input to notch filter stage 500. In notch filter stage 500, x[k−1] corresponds to the input x[k] to notch filter stage 500 associated with the most recent servo wedge k−1 crossed by the magnetic head, x[k−2] corresponds to the input x[k] to notch filter stage 500 associated with the next most recent servo wedge k−2 crossed by the magnetic head, y[k−1] corresponds to the output y[k] from notch filter stage 500 associated with the most recent servo wedge k−1 crossed by the magnetic head, and y[k−2] corresponds to the output y[k] from notch filter stage 500 associated with the next most recent servo wedge k−2 crossed by the magnetic head.

In operation, a magnetic head of HDD 100 crosses a servo wedge k and a PES is determined that is associated with servo wedge k. A servo controller (e.g., servo controller 315 of FIG. 3) generates a control signal associated with servo wedge k (e.g., control signal 444 or 446 of FIG. 4), and this control signal is provided to a digital filter engine (e.g., digital filter engine 318 of FIG. 3) to produce a filtered control signal (e.g., control signal 344 or 346 of FIGS. 3 and 4). Notch filter stage 500 generates output y[k] in response to receiving input x[k], where x[k] is based on the control signal generated by the servo controller. As shown mathematically in Equation 1 and schematically in FIG. 5, notch filter stage 500 generates output y[k] via five multiply-accumulate operations: $b_0x[k]+b_1x[k-1]+b_2x[k-2]-a_1y[k-1]-a_2y[k-2]$. Thus, output y[k] is a function of the two most recent inputs to notch filter stage 500 (x[k−1], x[k−2]), the two most recent outputs from notch filter stage 500 (y[k−1], y[k−2]), and the newest input to notch filter stage 500 (x[k]). In addition to generating output y[k] in response to receiving input x[k], notch filter stage 500 also updates state variable values 540 of notch filter stage 500 for performing a filtering operation associated with a servo wedge k+1, which is the next servo wedge to be crossed by the magnetic head of HDD 100.

Typically, notch filter stage 500 is employed in conjunction with a plurality of additional notch filter stages, for example five to ten, or more. Given that each notch filter stage generates an output by performing five multiply-accumulate operations, the total number of computations involved in performing filtering operations on a control signal can equal one hundred or more. As a result, computational delay associated with such filtering operations (the time between when a control signal is available as a notch-filter input and the time that the notch-filter output is determined and implemented) can be considerable, e.g., on the order of a microsecond or more. Such computational delay can significantly reduce or even eliminate the stability margins of the servo system of HDD 100.

Digital Filter with Pre-Computed Output

According to various embodiments, the above-described computational delay associated with performing filtering operations on a control signal associated with a particular servo wedge k can be greatly reduced. In the embodiments, a pre-computed digital filter output is determined for the control signal before the control signal is actually available. Referring to Equation 1, four of the five multiply-accumulate operations for a given notch filter stage can be completed before the magnetic head of HDD 100 crosses servo wedge k: $b_1x[k-1]+b_2x[k-2]-a_1y[k-1]-a_2y[k-2]$. In the embodiments, for each notch filter stage of a particular notch filter, these four multiply-accumulate operations can be performed without the control signal for servo wedge k (x[k]) by using an estimated control signal for x[k] as an input to the particular notch filter. Then, once the actual control signal for servo wedge k has been determined, an implemented second digital filter output for the digital filter is determined based on the pre-computed digital filter output for that particular notch filter and a difference between the estimated control signal and the actual control signal. Thus, the implemented second digital filter output can be determined with a small number of computations after the actual control signal x[k] is available. The implemented second digital filter output of the digital filter is used to control the magnetic head position in response to crossing the servo wedge. Examples of such embodiments are described below in conjunction with FIGS. 6 and 7.

Figure 6:
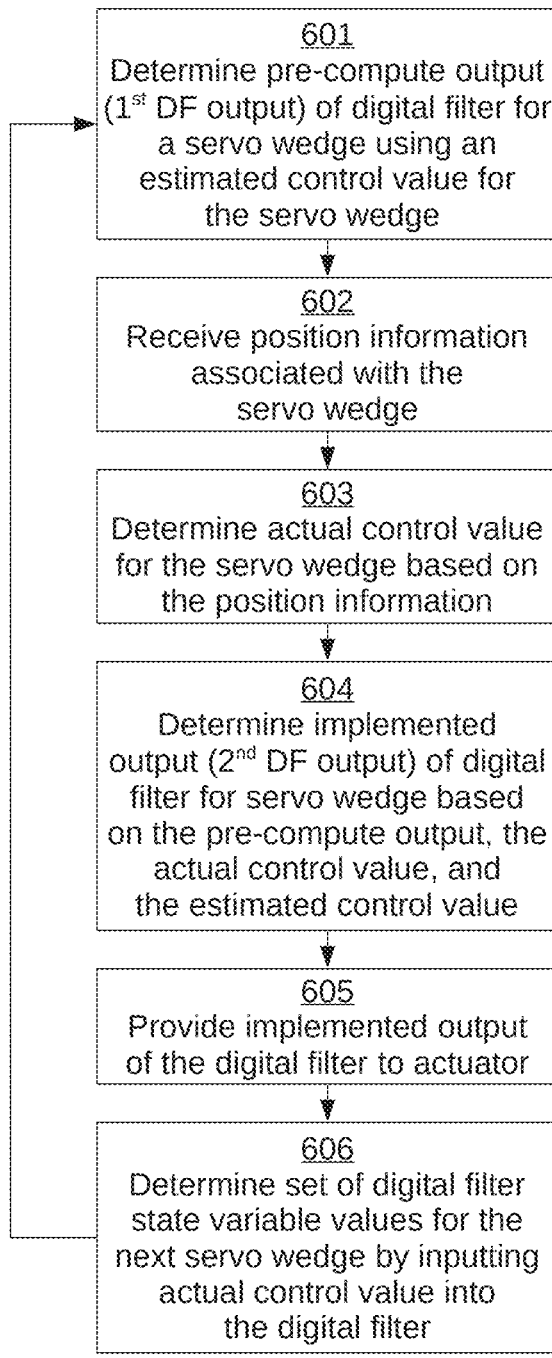
FIG. 6 sets forth a flowchart of method steps for controlling an actuator for a magnetic head of a disk drive via a digital filter, according to various embodiments.
Figure 7:
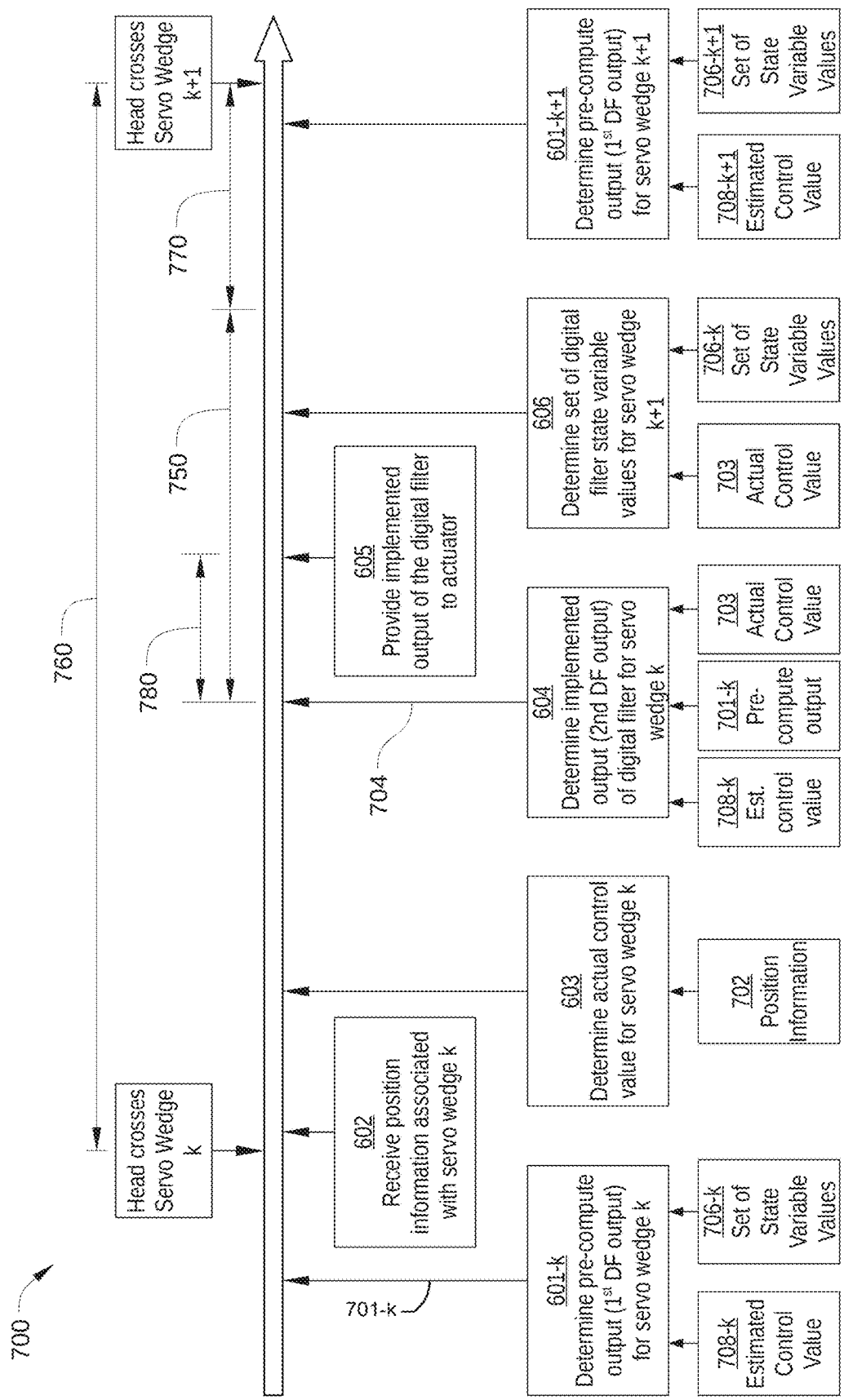
FIG. 7 is a timeline illustrating the occurrence in time of the method steps of FIG. 6 relative to a magnetic head crossing a servo wedge and a following servo wedge.

FIG. 6 sets forth a flowchart of method steps for controlling an actuator for a magnetic head of a disk drive via a digital filter, according to various embodiments. FIG. 7 is a timeline illustrating the occurrence in time of the method steps of FIG. 6 relative to a magnetic head crossing a servo wedge k and a following servo wedge k+1. FIG. 7 also shows various inputs that enable certain method steps.

Although the method steps are described in conjunction with HDD 100 of FIGS. 1-5, persons skilled in the art will understand that the method steps may be performed with other types of systems. The control algorithms for the method steps reside in a suitable controller associated with HDD 100, such as microprocessor-based controller 133, servo controller 315, and/or digital filter engine 318. The control algorithms can be implemented in whole or in part as software- or firmware-implemented logic, and/or as hardware-implemented logic circuits. For example, in some embodiments, operations performed by digital filter engine 318 can be implemented as hardware-based logic circuits.

As shown, a method 600 begins at step 601, where the controller associated with HDD 100 determines a precomputed output 701-$k$ of a digital filter of digital filter engine 318, such as first notch filter 410 or second notch filter 420. It is noted that, according to various embodiments, in method 600 the controller determines two outputs of the digital filter for servo wedge k, even though only one of these two outputs of the digital filter is implemented by an actuator for servo wedge k. In the embodiment illustrated in FIG. 7, the multiple outputs of the digital filter include pre-computed output 701-$k$, which is the first digital filter (DF) output, and an implemented output 704, which is the second DF output. It is further noted that the controller determines pre-computed output 701-$k$ further based on a set of parameter values for the digital filter that can be consistent with parameter values 530 of FIG. 5. For clarity, the set of parameter values for the digital filter are not shown as an input in FIG. 7.

For servo wedge k, the controller determines pre-computed output 701-$k$ with the digital filter, based on an estimated control value 708-$k$ for servo wedge k and, for each stage of the digital filter, a set of state variable values 706-$k$. For each stage of the digital filter, all of the set of state variable values 706-$k$ are known: $x[k-1]$, $x[k-2]$, $y[k-1]$, $y[k-2]$. This is because these state variable values are based on previous inputs to and outputs from each stage of the digital filter. However, as shown in FIG. 7, the controller determines pre-computed output 701-$k$ before the magnetic head being controlled has crossed servo wedge k. Therefore, the actual control value for servo wedge k is not yet available as input $x[k]$ for the first stage of the digital filter, and Equation 1 cannot be solved for the various stages of the digital filter. Consequently, in step 601, the controller substitutes an estimated control value 708-$k$ for the actual control value, and is entered as the input $x[k]$ of the first stage of the digital filter. As noted previously, for each subsequent stage of the digital filter, the input for that stage is the output $y[k]$ of the preceding stage of the digital filter.

In some embodiments, the controller determines estimated control value 708-$k$ based on one or more earlier inputs ($x[k]$) of the digital filter. Thus, in such embodiments, the controller determines estimated control value 708-$k$ for the digital filter based on an input of that digital filter for one or more preceding servo wedges. For example, in some embodiments, the estimated control value 708-$k$ for the digital filter is equal to the input ($x[k]$) of the digital filter for servo wedge k-1, which is the servo wedge that precedes and is adjacent to servo wedge k. In another embodiment, the estimated control value 708-$k$ for the digital filter is equal to a value based on the inputs ($x[k]$) of that digital filter for multiple preceding servo wedges, such as servo wedge k-1, servo wedge k-2, and/or servo wedge k-3. In such embodiments, the value of the estimated control value 708-$k$ for the digital filter can be any algorithmically defined value based on the output or input of the digital filter for multiple preceding servo wedges, including an average of such outputs or inputs, a value extrapolated from such outputs or inputs, and the like. Alternatively, in some embodiments, the controller assumes the estimated control value 708-$k$ for the digital filter is 0.

In step 601, the controller generates pre-computed output 701-$k$ by using estimated control value 708-$k$ and set of state variable values 706-$k$. Specifically, the controller uses estimated control value 708-$k$ as the control value that is entered as the input $x[k]$ to the first stage of the digital filter, and uses set of state variable values 706-$k$ for the values of the different state variables for each stage of the digital filter. In conventional operation, when a notch filter stage determines output $y[k]$ for servo wedge k, the state variable values $x[k-1]$, $x[k-2]$, $y[k-1]$, $y[k-2]$ for that notch filter stage are updated to new values that are used subsequently to determine an output for the next servo wedge k+1. Thus, in conventional operation, the new value for $x[k-2]$ is updated to the previous value of $x[k-1]$, the new value for $x[k-1]$ is updated to the value of the just-received input $x[k]$, the new value for $y[k-2]$ is updated to the previous value of $y[k-1]$, and the new value for $y[k-1]$ is updated to the value of the just-determined output $y[k]$. By contrast, according to various embodiments, in step 601, the digital filter operates in an alternate mode, in which the state variable values $x[k-1]$, $x[k-2]$, $y[k-1]$, $y[k-2]$ for each notch filter stage are not updated to new values. Instead, the same values are retained for set of state variable values 706-$k$ during step 601. In the embodiments, the state variable values $x[k-1]$, $x[k-2]$, $y[k-1]$, $y[k-2]$ for each notch filter stage are updated to the appropriate new values later in method 600 (see step 606), when an actual control value 703 has been determined and can be used as the control value that is entered as the input $x[k]$ to the first stage of the digital filter.

In step 602, the controller receives position information 702 associated with servo wedge k. As shown, step 602 occurs after the magnetic head being controlled has crossed servo wedge k and a PES for the magnetic head can be determined. It is noted that in some instances, the controller has not completed step 601 when step 602 occurs and step 603 begins. That is, the controller can receive position information 702 associated with servo wedge k while in the process of determining pre-computed output 701-$k$ for servo wedge k. Thus, in such instances, a portion of a first time interval in which pre-computed output 701-$k$ is determined overlaps with at least a portion of a second time interval in which an actual control value 703 is determined in step 603.

In step 603, the controller determines an actual control value 703 for servo wedge k based at least in part on position information 702. In some embodiments, actual control value 703 corresponds to a current or voltage to be applied to an actuator, such as VCM 128 or additional actuator 129. Generally, actual control value 703 is based on a PES indicated by position information 702 as well as other information, such as previous PES measurements, inputs from one or more accelerometers, a measured temperature, measured power supply voltages, or a target acceleration or velocity profile to be followed by the magnetic head.

In step 604, the controller determines an implemented output 704 for the digital filter. As shown in FIG. 7, actual control value 703 is now available to the controller in step 604. In a conventional HDD, once actual control value 703 is available, actual control value 703 is input to the digital filter, then the output of the digital filter is implemented by the actuator. However, as described previously, a computational delay 750 associated with performing all filtering operations after actual control value 703 is available can be problematic. As shown, computational delay 750 can expend a significant portion of the time interval 760 between the magnetic head crossing servo wedge k and servo wedge k+1. This delays the time when a control value can be implemented by the actuator, and therefore is highly undesirable. Specifically, as a remainder time interval 770 is shortened, the stability margins of the servo system of HDD 100 are reduced. By contrast, according to the various embodiments described herein, step 604 can be completed in a relatively short time interval 780 so that a control value (implemented output 704) can be provided to the actuator quickly.

In some embodiments, the controller determines implemented output 704 (the second DF output) based on pre-computed first output 701-$k$, estimated control value 708-$k$, and actual control value 703. For example, in some embodiments, the controller determines implemented output 704 based on a difference between estimated control value 708-$k$ and actual control value 703. In one such embodiment, the controller determines implemented output 704 based on Equation 2, where G is a gain coefficient or other scaling variable that modifies a difference between actual control value 703 and estimated control value 708-$k$. In some embodiments, in a multi-stage filter G can be the product of the $b_0$ parameter values for each notch filter stage 500 included in the filter.

$$(\text{Implemented Output 704})_k = \{(\text{Actual Cntl Value 703})_k - (\text{Est Cntl Value 780})_k\} * G + (\text{Pre-Computed First Output 701})_k \quad (2)$$

As shown in Equation 2, in step 604, the controller can determine implemented output 704 with two addition operations and a single multiply operation. Consequently, step 604 can be completed in time interval 780, which can be up to two orders of magnitude shorter than the computational delay 750 that is associated with performing all filtering operations after actual control value 703.

Implemented output 704 is referred to herein as the second DF output of the digital filter for servo wedge k. However, it is noted that implemented output 704 is not generated by inputting an input x[k] into the digital filter, but instead is effectively a superposition of two outputs of the digital filter. Specifically, the two outputs are: 1) the output of the digital filter when the input is estimated control value 708-$k$ and the states of the digital filter have correct values, and (2) the output of the digital filter when the input is Actual Cntl Value 703 and the states of the digital filter are zero.

In step 605, the controller transmits or otherwise provides implemented output 704 to the actuator that is controlling the position of the magnetic head, such as VCM 128 or additional actuator 129. The actuator then implements implemented output 704.

In some embodiments, prior to providing implemented output 704 to the actuator, the controller performs one or more post-processing operations on implemented output 704. For example, in some embodiments, the controller performs one or more linear post-processing operations on implemented output 704 and/or one or more non-linear post-processing operations on implemented output 704. Examples of linear post-processing operations include a scaling operation (multiplying implemented output 704 by a scaling factor) and/or an offset operation (adding an offset value to implemented output 704). Examples of non-linear post-processing operations include one or more of: a saturation, slew-rate-limiting, and/or linearization operation. In some embodiments, a saturation operation includes placing a hard limit on implemented output 704. In some embodiments, a slew-rate limiting operation includes applying a limit on how much implemented output 704 can change from one sample to the next. In some embodiments, a linearization operation includes passing implemented output 704 through a non-linear filter, for example to counter non-linearities of the actuator that receives implemented output 704.

In step 606, for each stage of the digital filter, the controller determines the set of state variable values 706-$k$ for the next servo wedge, which in FIG. 7 is servo wedge k+1. To determine the set of state variable values 706-$k$, the controller uses actual control value 703 as an input to the digital filter and set of state variable values 706-$k$ as the values for each stage of the digital filter. In contrast to the generation of pre-computed output 701-$k$ in step 601, in step 606, when a notch filter stage receives input x[k] and determines output y[k] for servo wedge k, the state variable values x[k−1], x[k−2], y[k−1], y[k−2] for that notch filter stage are updated to new values that are used subsequently to determine an output for the next servo wedge k+1. Thus, in step 606, the controller uses the digital filter to generate a set of state variable values 706-$k$+1 that can be used in the next iteration of step 601 to determine a pre-computed output 701-$k$+1 for servo wedge k+1. It is noted that in step 606, the output y[k] that is determined for servo wedge k, is not used to control the magnetic head. This is because implemented output 704 for the digital filter has already been provided to the actuator to control the position of the magnetic head in response to the magnetic head crossing servo wedge k.

In the embodiment shown in FIG. 7, step 606 can be performed after the controller provides implemented output 704 to the actuator and prior to the magnetic head passing over servo wedge k+1. Therefore, the computation time required to perform the many mathematical operations associated with determining output y[k] of a digital filter and updating the state variable values x[k−1], x[k−2], y[k−1], y[k−2] for each notch filter stage to new values does not contribute to computational delay in providing a control value to the actuator controlling the position of the magnetic head. Thus, in such embodiments, the relatively time-consuming task of updating the state variable values x[k−1], x[k−2], y[k−1], y[k−2] for each notch filter stage to new values is performed "off-line" and does not impact the stability of the servo control system of HDD 100.

Upon completion of step 606, method 600 returns to step 601, and another iteration of steps 601-606 is performed for servo wedge k+1. As shown in FIG. 7, in this next iteration of step 601, the controller determines a pre-computed output 701-$k$+1 based on an estimated control value 708-$k$+1 for servo wedge k+1 and, for each stage of the digital filter, a set of state variable values 706-$k$+1. It is noted that set of state variable values 706-$k$+1 is determined in step 606.

Implementation of Digital Filter with Pre-Compute in Multi-Rate System

In the embodiments described above, a digital filter with a pre-compute feature is described with respect to a single-rate control system. Thus, the servo system of HDD 100 is described as having a single-input single-output (SISO) digital control system, where the controller updating rate is the same as the plant output sampling rate. In practice, the servo system of a modern HDD is typically a multi-rate system, in which, for each position feedback signal received, the controller sequentially generates multiple output samples. For example, in some instances, each time a magnetic head of the HDD crosses a servo wedge, the servo controller of the HDD generates two VCM control signals (such as control signals 444 in FIG. 4) and/or two additional actuator control signals (such as control signals 446 in FIG. 4). In such instances, the impact of computational delay associated with filtering operations can have even greater impact on the stability margins of the servo system of the HDD. Thus, in HDDs that employ multi-rate servo systems, embodiments described herein can be even more beneficial. One such embodiment is described below in conjunction with FIG. 8.

Figure 8:
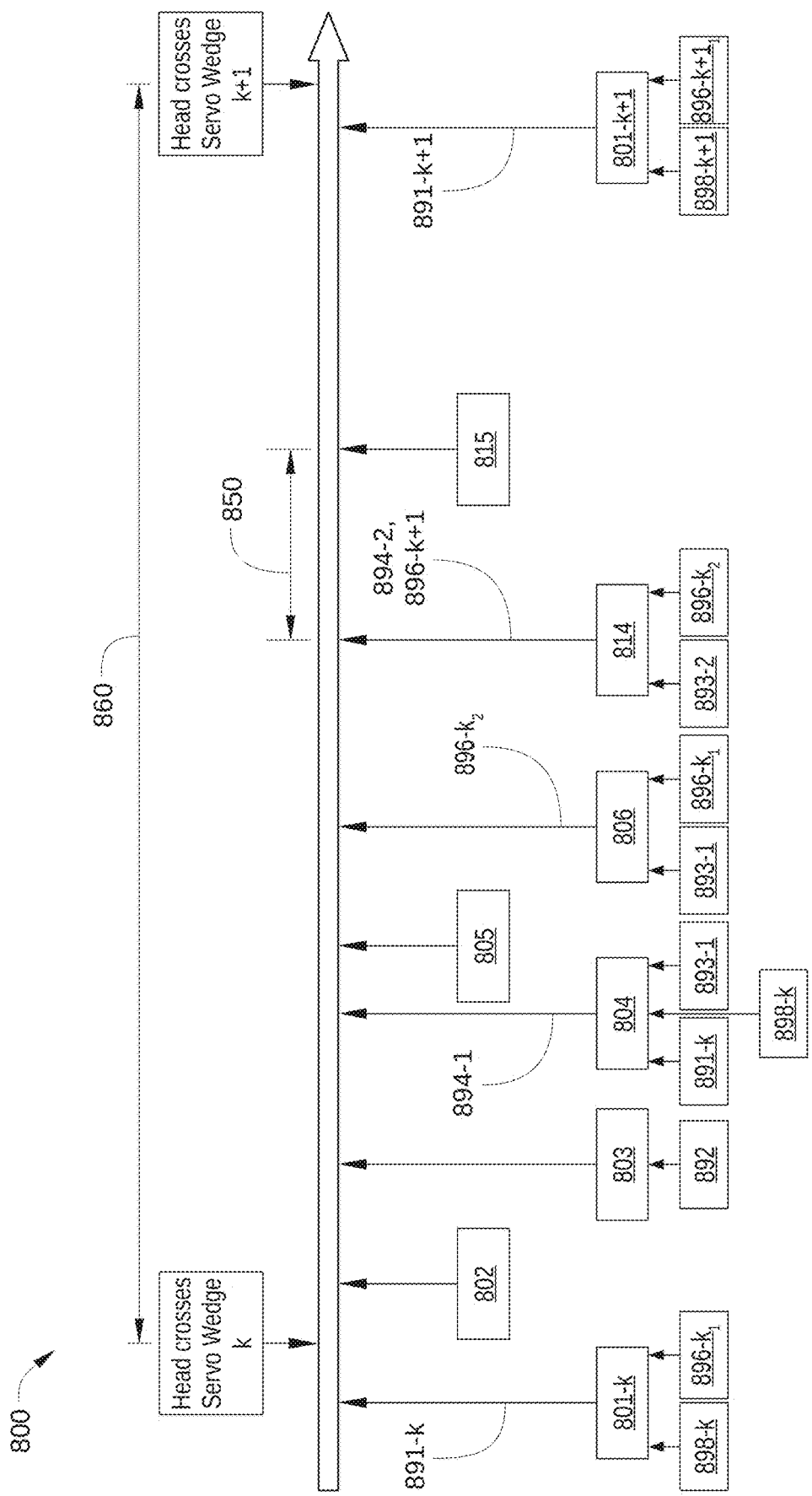
FIG. 8 is a timeline illustrating method steps for controlling an actuator for a magnetic head via a digital filter in a multi-rate servo system of the HDD of FIG. 1.

FIG. 8 is a timeline illustrating method steps for controlling an actuator for a magnetic head via a digital filter in a multi-rate servo system of HDD 100. FIG. 8 shows the occurrence in time of the method steps relative to a magnetic head crossing a servo wedge k and a following servo wedge k+1. FIG. 8 also shows various inputs that enable certain method steps.

Although the method steps are described in conjunction with HDD 100 of FIGS. 1-7, persons skilled in the art will understand that the method steps may be performed with other types of systems. The control algorithms for the method steps reside in a suitable controller associated with HDD 100, such as microprocessor-based controller 133, servo controller 315, and/or digital filter engine 318. The control algorithms can be implemented in whole or in part as software- or firmware-implemented logic, and/or as hardware-implemented logic circuits. For example, in some embodiments, operations performed by digital filter engine 318 can be implemented as hardware-based logic circuits.

As shown, a method 800 begins at step 801-$k$, where the controller associated with HDD 100 determines a pre-computed output 891-$k$ of a digital filter of digital filter engine 318 that is associated with servo wedge k, such as first notch filter 410 or second notch filter 420. It is noted that, according to various embodiments, in method 800 the controller determines multiple outputs of the digital filter for servo wedge k, two of which are implemented by an actuator for servo wedge k. In the embodiment illustrated in FIG. 8, the multiple outputs of the digital filter include pre-computed output 891-$k$, which is the first digital filter DF output for servo wedge k, a first implemented output 894-1, which is the second DF output for servo wedge k, and a second implemented output 894-2, which is the third DF output for servo wedge k.

In step 801-$k$, the controller determines pre-computed output 891-$k$ for servo wedge k with the digital filter. In some embodiments, the controller determines pre-computed output 891-$k$ consistent with the determination of pre-computed output 701-$k$ in step 601 of FIG. 6. In such embodiments, the controller determines pre-computed output 891-$k$ based on an estimated control value 898-$k$ for servo wedge k and, for each stage of the digital filter, a set of state variable values 896-$k_1$. Estimated control value 898-$k$ can be determined in step 801 consistent with the determination of estimated control value 708-$k$ in step 601 of FIG. 6. Set of state variable values 896-$k_1$ is the set of state variable values employed for generating first implemented output 894-1, which is the first of two output samples for servo wedge k. Set of state variable values 896-$k_1$ is known prior to step 801 based on computations performed when the magnetic head being controlled crosses servo wedge k−1.

In step 802, the controller receives position information 892 associated with servo wedge k. In some embodiments, step 802 can be consistent with step 602 of FIG. 6.

In step 803, the controller determines a first actual control value 893-1 and a second actual control value 893-2 for servo wedge k based at least in part on position information 892. In some embodiments, first actual control value 893-1 and second actual control value 893-2 correspond to a current or voltage to be applied to an actuator, and can be consistent with actual control value 703 of FIG. 7. In some embodiments, first actual control value 893-1 and second actual control value 893-2 are different values for servo wedge k, and in other embodiments, first actual control value 893-1 and second actual control value 893-2 are the same value for servo wedge k. Because the servo system of HDD 100 is a multi-rate control system, first actual control value 893-1 is filtered and provided to the actuator at a first time after the head crosses servo wedge k (see step 805), while second actual control value 893-2 is filtered and provided to the actuator at a second later time after the head crosses servo wedge k (see step 815). Thus, in such embodiments, the servo system of HDD 100 is a multi-rate control system having an output sampling rate of 2×. In other embodiments, the servo system of HDD 100 can have an output sampling rate of 3×, 4×, or more. In such embodiments, in step 803 the controller determines more than the two actual control values 894-1 and 894-2 that are shown in FIG. 8. Alternatively, in some embodiments, the controller determines first actual control value 893-1 for servo wedge k in step 803 and second actual control value 893-2 for servo wedge k in a subsequent step, for example in parallel with steps 804 and/or 805.

In step 804, the controller determines a first implemented output 894-1 for the digital filter, which is the first of two output samples for servo wedge k. As shown in FIG. 8, first actual control value 893-1 is now available to the controller in step 804. In some embodiments, the controller determines first implemented output 894-1 in a manner consistent with the determination of pre-computed first output 701-$k$ in FIG. 7. Thus, the controller determines first implemented output 894-1 based on pre-computed first output 891-$k$, estimated control value 898-$k$, and first actual control value 893-1, for example via Equation 2.

In step 805, the controller transmits or otherwise provides first implemented output 894-1 to the actuator that is controlling the position of the magnetic head, such as VCM 128 or additional actuator 129. The actuator then implements first implemented output 894-1. In some embodiments, prior to providing first implemented output 894-1 to the actuator, the controller performs one or more post-processing operations on first implemented output 894-1.

In step 806, for each stage of the digital filter, the controller determines the set of state variable values 896-$k_2$. Set of state variable values 896-$k_2$ is the set of state variable values employed for generating second implemented output 894-2, which is the second of two output samples for servo wedge k. To determine the set of state variable values 896-$k_2$, the controller uses first actual control value 893-1 as an input to the digital filter and set of state variable values 896-$k_1$ as the values for each stage of the digital filter. In contrast to the generation of pre-computed output 891-$k$ in step 801, in step 806, when a notch filter stage receives input x[k] and determines output y[k] for servo wedge k, the state variable values x[k−1], x[k−2], y[k−1], y[k−2] for that notch filter stage are updated to new values that are used subsequently to determine second implemented output 894-2. Specifically, the new values are the set of state variable values 896-$k_2$. Thus, in step 806, the controller uses the digital filter to generate set of state variable values $896\text{-}k_2$, which are used to determine second implemented output $894\text{-}2$ in step $814$.

In step $814$, the controller determines second implemented output $894\text{-}2$. Unlike first implemented output $894\text{-}1$, second implemented output $894\text{-}2$ can be determined using a conventional filtering process based on second actual control value $893\text{-}2$ for servo wedge k and set of state variable values $896\text{-}k_2$. It is noted that the values of set of state variable values $896\text{-}k_2$ employed in step $814$ is different than set of state variable values $896\text{-}k_1$ employed in step $801$ to determine pre-computed output $891\text{-}k$ for servo wedge k. In addition, in step $814$, for each stage of the digital filter, the controller determines the set of state variable values $896\text{-}k+1_1$ for the next servo wedge, which in FIG. $8$ is servo wedge k+1. In some embodiments, the controller determines the set of state variable values $896\text{-}k+1_1$ consistent with the determination of set of state variable values $706\text{-}k$ in step $606$ of FIG. $6$.

It is noted that the second implemented output $894\text{-}2$ is determined via conventional filtering operations, and therefore can include a large number of mathematical computations. As a result, a time interval $850$ required to complete step $814$ can be a significant portion of a time interval $860$ between the magnetic head crossing servo wedge k and servo wedge k+1. However, because second implemented output $894\text{-}2$ is not the first control output to be implemented for servo wedge k, time interval $850$ generally does not produce computational delay in the implementation of second implemented output $894\text{-}2$, as shown in FIG. $8$.

In step $815$, the controller transmits or otherwise provides second implemented output $894\text{-}2$ to the actuator that is controlling the position of the magnetic head, such as VCM $128$ or additional actuator $129$. The actuator then implements second implemented output $894\text{-}2$. In some embodiments, prior to providing second implemented output $894\text{-}2$ to the actuator, the controller performs one or more post-processing operations on second implemented output $894\text{-}2$.

In sum, implementation of one or more embodiments of method $800$ prevents computational delay in the control of an actuator for a magnetic head via a digital filter in a multi-rate servo system.

While the foregoing is directed to embodiments of the present invention, other and further embodiments of the invention may be devised without departing from the basic scope thereof, and the scope thereof is determined by the claims that follow.

I claim:

1. A method of controlling an actuator for a magnetic head of a disk drive via a digital filter, the method comprising:
   determining a first output of the digital filter for a first servo wedge, based on a set of state variable values associated with the digital filter and an estimated control input to the digital filter;
   after determining the first output, receiving an actual control input for the digital filter that is based on position information associated with the magnetic head crossing the first servo wedge;
   determining a second output of the digital filter for the first servo wedge based on the first output, the estimated control input, and the actual control input; and
   applying the second output of the digital filter to the actuator.

2. The method of claim 1, further comprising:
   determining a third output of the digital filter for the first servo wedge based on the actual control input and the set of state variable values; and
   generating a set of updated state variable values associated with the digital filter by updating the set of state variable values based on the third output.

3. The method of claim 2, wherein the set of updated state variable values is for a second servo wedge that is the first servo wedge to be crossed by the magnetic head after the magnetic head crosses the first servo wedge.

4. The method of claim 1, wherein the first output is determined prior to the magnetic head crossing the first servo wedge.

5. The method of claim 1, wherein a portion of a first time interval in which the first output is determined overlaps with at least a portion of a second time interval in which the actual control input to the digital filter is determined.

6. The method of claim 1, further comprising performing one or more post-processing operations on the second output of the digital filter prior to applying the second output to the actuator.

7. The method of claim 6, wherein the one or more post-processing operations include at least one of a scaling operation or an offset operation.

8. The method of claim 1, wherein the set of state variable values comprises values that are stored prior to the magnetic head crossing the first servo wedge.

9. The method of claim 1, wherein the actual control input comprises a control value associated with the first servo wedge.

10. The method of claim 1, wherein the estimated control input comprises a third output of the digital filter for a second servo wedge that precedes the first servo wedge.

11. The method of claim 10, wherein the second servo wedge is adjacent to the first servo wedge.

12. The method of claim 1, wherein at least one value in the set of state variable values comprises a third output of the digital filter for a second servo wedge that precedes the first servo wedge.

13. The method of claim 1, wherein the second output of the digital filter is based on a difference between the estimated control input and the actual control input.

14. The method of claim 13, wherein the second output of the digital filter is further based on a gain coefficient that modifies the difference between the estimated control input and the actual control input.

15. The method of claim 1, wherein the second output of the digital filter is further based on a combination of the first output and a difference between the estimated control input and the actual control input.

16. A magnetic disk drive, comprising
   a magnetic head;
   an actuator for positioning the magnetic head;
   a digital filter;
   a recording surface with a plurality of servo wedges formed thereon; and
   a controller configured to perform the steps of:
   determining a first output of the digital filter for a first servo wedge included in the plurality of servo wedges, based on a set of state variable values associated with the digital filter and an estimated control input to the digital filter;
   after determining the first output, receiving an actual control input for the digital filter that is based on position information associated with the magnetic head crossing the first servo wedge;
   determining a second output of the digital filter for the first servo wedge based on the first output, the estimated control input, and the actual control input; and
   applying the second output of the digital filter to the actuator.

17. The magnetic disk drive of claim 16, wherein the controller is further configured to perform the steps of:
   determining a third output of the digital filter for the first servo wedge based on the actual control input and the set of state variable values; and
   generating a set of updated state variable values associated with the digital filter by updating the set of state variable values based on the third output.

18. The magnetic disk drive of claim 17, wherein the set of updated state variable values is for a second servo wedge that is the first servo wedge to be crossed by the magnetic head after the magnetic head crosses the first servo wedge.

19. The magnetic disk drive of claim 16, wherein the actual control input comprises a control value associated with the first servo wedge.

20. The magnetic disk drive of claim 16, wherein the second output of the digital filter is further based on a combination of the first output and a difference between the estimated control input and the actual control input.

* * * * *